US012650871B1

(12) United States Patent
Manthey

(10) Patent No.: US 12,650,871 B1
(45) Date of Patent: Jun. 9, 2026

(54) DYNAMIC PAGE SIZE SELECTION FOR VIRTUAL MEMORY SHARING

(71) Applicant: Amazon Technologies, Inc., Seattle, WA (US)

(72) Inventor: Norbert Manthey, Dresden (DE)

(73) Assignee: Amazon Technologies, Inc., Seattle, WA (US)

( * ) Notice: Subject to any disclaimer, the term of this patent is extended or adjusted under 35 U.S.C. 154(b) by 445 days.

(21) Appl. No.: 18/127,297

(22) Filed: Mar. 28, 2023

(51) Int. Cl.
G06F 9/455 (2018.01)

(52) U.S. Cl.
CPC .................... G06F 9/45558 (2013.01); *G06F 2009/45583* (2013.01)

(58) Field of Classification Search
None
See application file for complete search history.

(56) References Cited

U.S. PATENT DOCUMENTS 10,731,181 B2 * 8/2020 Chen .............. C12Y 301/21004
2011/0231593 A1 * 9/2011 Yasufuku ............ G06F 12/0831
711/3

2021/0382737 A1 * 12/2021 Cheng ................. G06F 9/45558
2023/0012693 A1 * 1/2023 Aguilera ............. G06F 11/2094
2023/0065530 A1 * 3/2023 Mohanty ............. G06F 11/3608
2024/0119006 A1 * 4/2024 Muthukrishnan ... G06F 12/0882

* cited by examiner

*Primary Examiner* — Wynuel S Aquino
(74) *Attorney, Agent, or Firm* — Perilla Knox & Hildebrandt LLP; Thomas B. Hildebrandt

(57) ABSTRACT

Techniques for managing the memory of computing devices that host multiple VMs by selecting optimally sized pages of virtual memory for programs running in the VMs. Virtual memory has traditionally been divided into pages of a single size (e.g., small, large, or huge) that are then offered to programs running in VMs. These page sizes have different benefits and drawbacks that must be considered when selecting the best page size for virtual memory. For example, small pages increase memory sharing between the VMs, but also result in an execution slowdown. Conversely, large pages improve execution performance by reducing latency in address translations, but limit memory sharing. This disclosure describes using small pages for sharable memory, and using large pages for private memory that cannot be shared. This provides the high performance needed for certain applications by using large pages, but still allows for increased memory sharing using small pages.

20 Claims, 10 Drawing Sheets

Host Device 102

200

HOST DEVICE 102

| CPU(s) 202 | COMMUNICATION INTERFACE(S) 204 |

MEMORY MANAGEMENT UNIT (MMU) 206

TRANSLATION LOOKASIDE BUFFER (TLB) 208

MEMORY 108

HOST OS 210

VIRTUAL MACHINES 104

APPLICATION(S) 110

GUEST OS 114

HYPERVISOR 124

HARDWARE ADDRESSES 126

SECONDARY STORAGE (DISK) 212

. . .

300

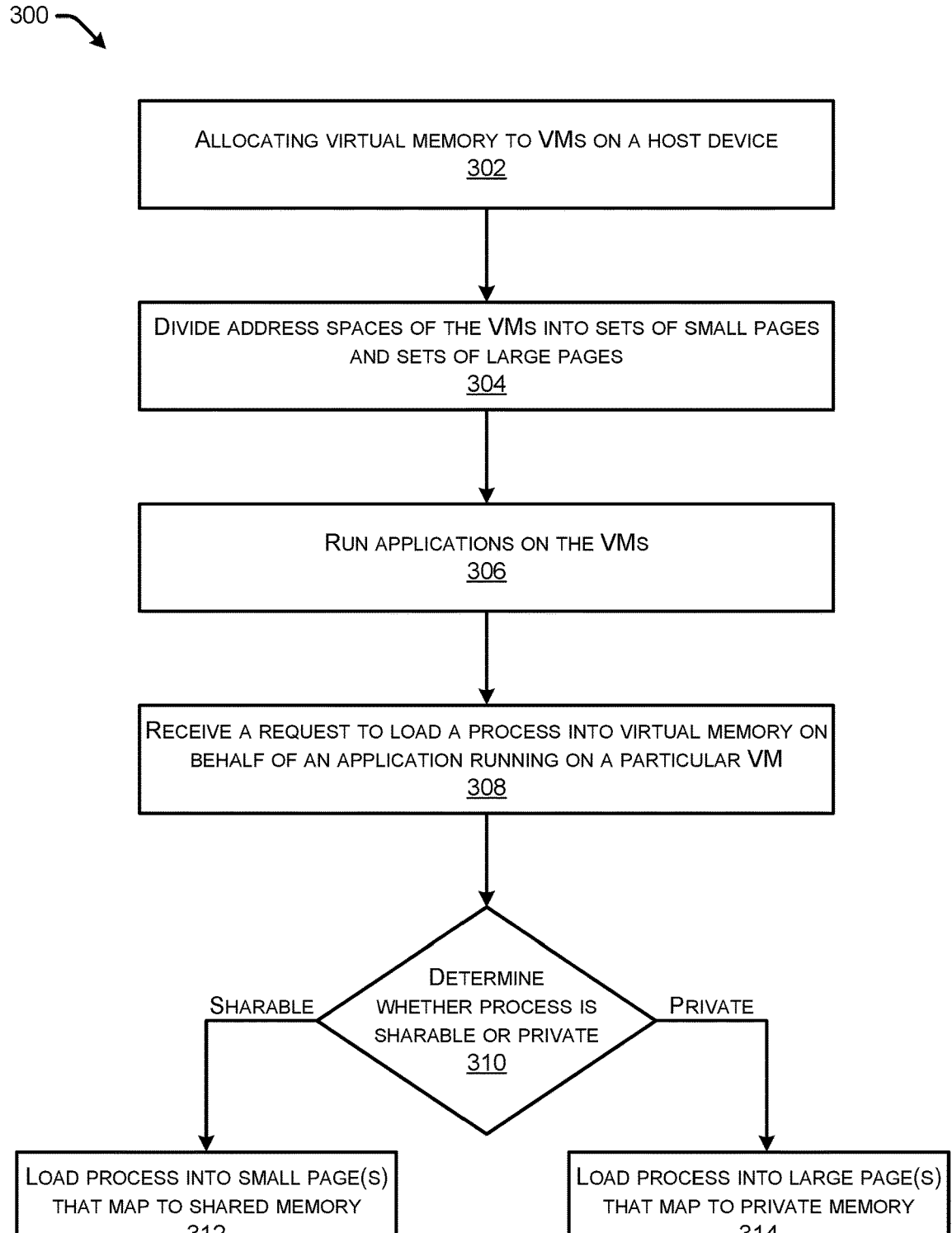

ALLOCATING VIRTUAL MEMORY TO VMS ON A HOST DEVICE
302

DIVIDE ADDRESS SPACES OF THE VMS INTO SETS OF SMALL PAGES
AND SETS OF LARGE PAGES
304

RUN APPLICATIONS ON THE VMS
306

RECEIVE A REQUEST TO LOAD A PROCESS INTO VIRTUAL MEMORY ON
BEHALF OF AN APPLICATION RUNNING ON A PARTICULAR VM
308

DETERMINE
WHETHER PROCESS IS
SHARABLE OR PRIVATE
310

SHARABLE

PRIVATE

LOAD PROCESS INTO SMALL PAGE(S)
THAT MAP TO SHARED MEMORY
312

LOAD PROCESS INTO LARGE PAGE(S)
THAT MAP TO PRIVATE MEMORY
314

FIG. 3

Figure 4A:
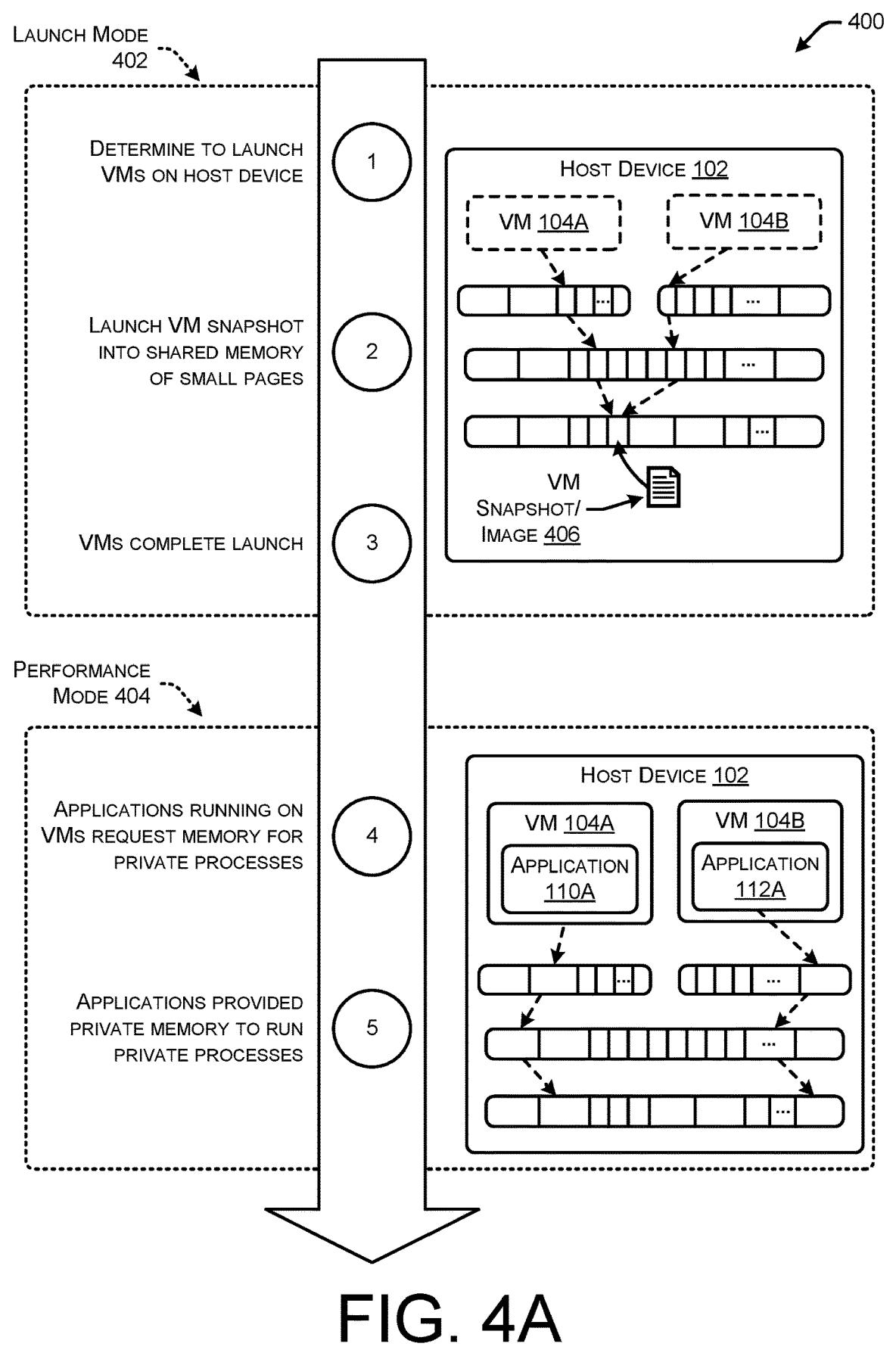

LAUNCH MODE
402

DETERMINE TO LAUNCH
VMs ON HOST DEVICE          ①

HOST DEVICE 102

VM 104A          VM 104B

LAUNCH VM SNAPSHOT
INTO SHARED MEMORY          ②
OF SMALL PAGES

VMs COMPLETE LAUNCH          ③

VM
SNAPSHOT/
IMAGE 406

PERFORMANCE
MODE 404

APPLICATIONS RUNNING ON
VMs REQUEST MEMORY FOR          ④
PRIVATE PROCESSES

HOST DEVICE 102

VM 104A          VM 104B

APPLICATION
110A          APPLICATION
112A

APPLICATIONS PROVIDED
PRIVATE MEMORY TO RUN          ⑤
PRIVATE PROCESSES

Figure 4B:
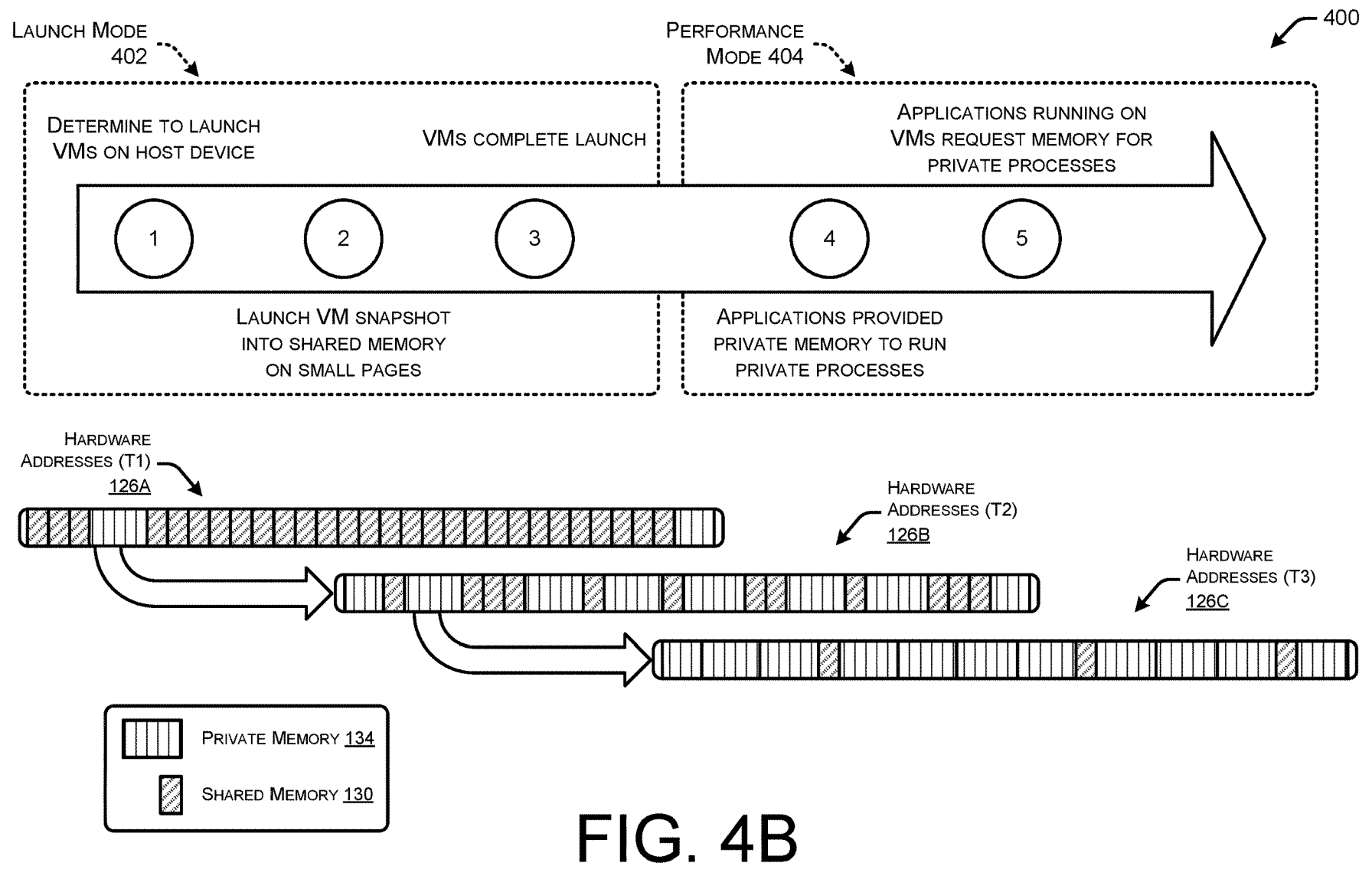

LAUNCH MODE 402

PERFORMANCE MODE 404

APPLICATIONS RUNNING ON VMs REQUEST MEMORY FOR PRIVATE PROCESSES

VMs COMPLETE LAUNCH (1)  (2)  (3)  (4)  (5)

DETERMINE TO LAUNCH VMs ON HOST DEVICE

LAUNCH VM SNAPSHOT INTO SHARED MEMORY ON SMALL PAGES

APPLICATIONS PROVIDED PRIVATE MEMORY TO RUN PRIVATE PROCESSES

HARDWARE ADDRESSES (T1) 126A

HARDWARE ADDRESSES (T2) 126B

HARDWARE ADDRESSES (T3) 126C

PRIVATE MEMORY 134

SHARED MEMORY 130

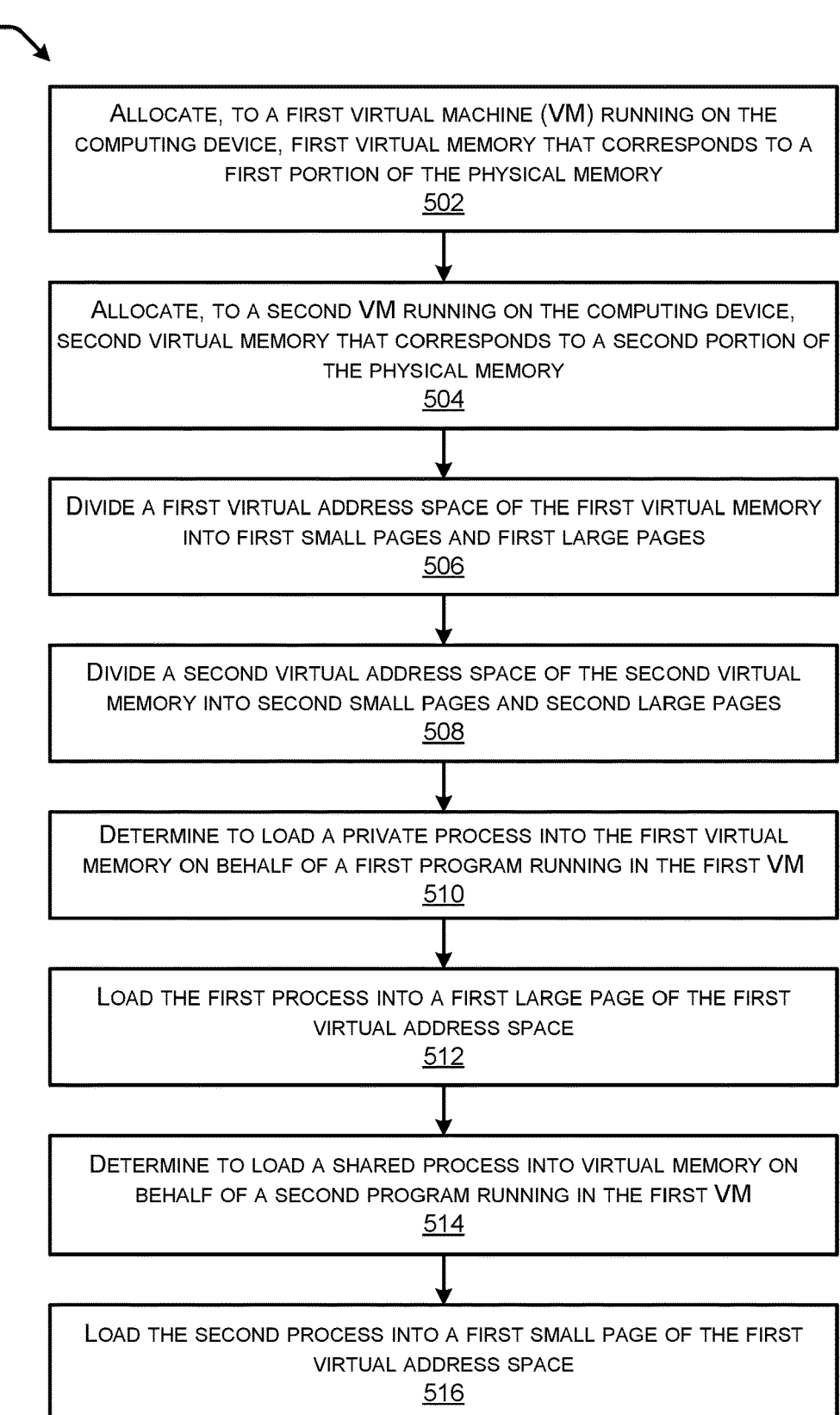

ALLOCATE, TO A FIRST VIRTUAL MACHINE (VM) RUNNING ON THE COMPUTING DEVICE, FIRST VIRTUAL MEMORY THAT CORRESPONDS TO A FIRST PORTION OF THE PHYSICAL MEMORY
502

ALLOCATE, TO A SECOND VM RUNNING ON THE COMPUTING DEVICE, SECOND VIRTUAL MEMORY THAT CORRESPONDS TO A SECOND PORTION OF THE PHYSICAL MEMORY
504

DIVIDE A FIRST VIRTUAL ADDRESS SPACE OF THE FIRST VIRTUAL MEMORY INTO FIRST SMALL PAGES AND FIRST LARGE PAGES
506

DIVIDE A SECOND VIRTUAL ADDRESS SPACE OF THE SECOND VIRTUAL MEMORY INTO SECOND SMALL PAGES AND SECOND LARGE PAGES
508

DETERMINE TO LOAD A PRIVATE PROCESS INTO THE FIRST VIRTUAL MEMORY ON BEHALF OF A FIRST PROGRAM RUNNING IN THE FIRST VM
510

LOAD THE FIRST PROCESS INTO A FIRST LARGE PAGE OF THE FIRST VIRTUAL ADDRESS SPACE
512

DETERMINE TO LOAD A SHARED PROCESS INTO VIRTUAL MEMORY ON BEHALF OF A SECOND PROGRAM RUNNING IN THE FIRST VM
514

LOAD THE SECOND PROCESS INTO A FIRST SMALL PAGE OF THE FIRST VIRTUAL ADDRESS SPACE
516

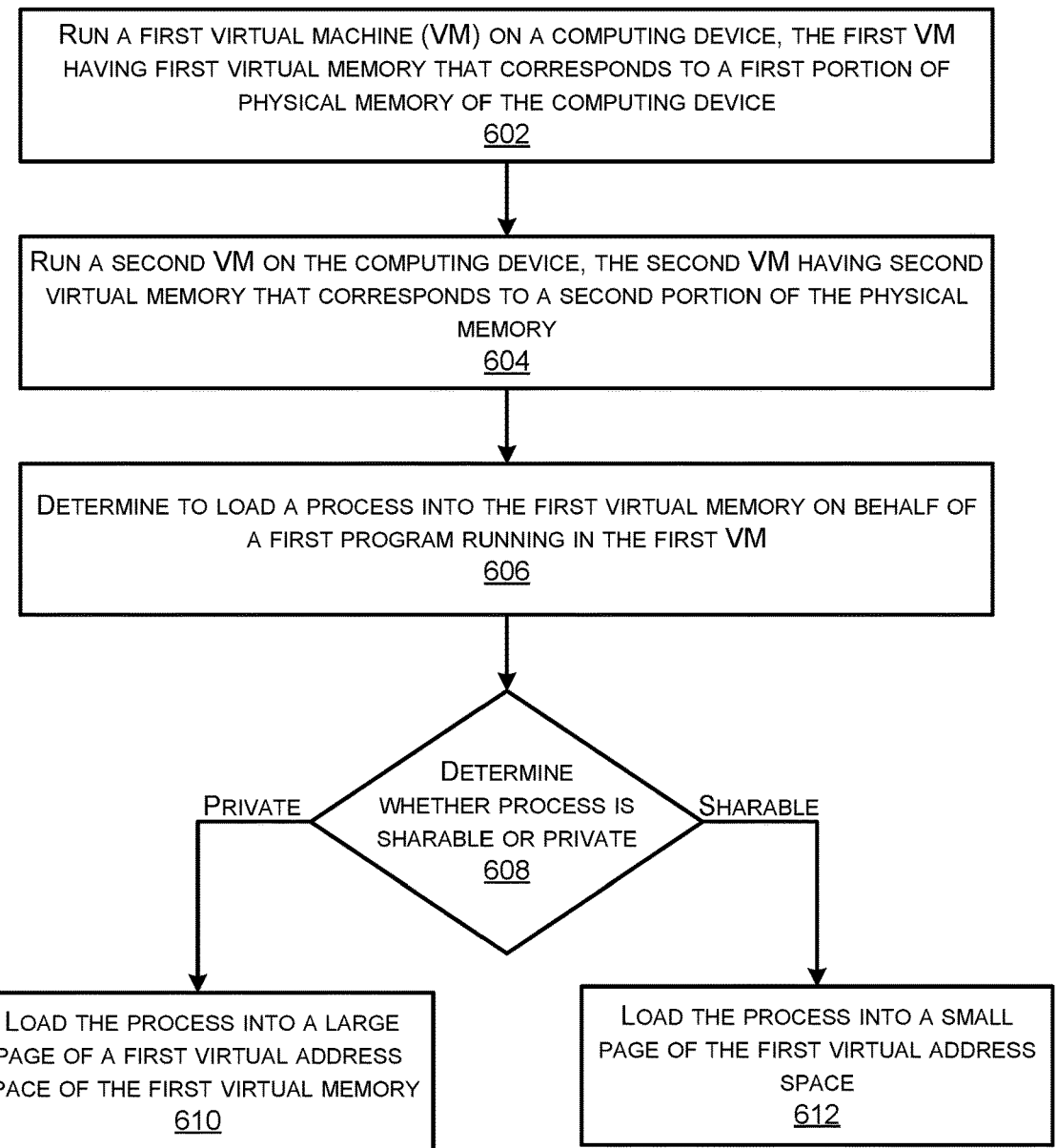

RUN A FIRST VIRTUAL MACHINE (VM) ON A COMPUTING DEVICE, THE FIRST VM
HAVING FIRST VIRTUAL MEMORY THAT CORRESPONDS TO A FIRST PORTION OF
PHYSICAL MEMORY OF THE COMPUTING DEVICE
602

RUN A SECOND VM ON THE COMPUTING DEVICE, THE SECOND VM HAVING SECOND
VIRTUAL MEMORY THAT CORRESPONDS TO A SECOND PORTION OF THE PHYSICAL
MEMORY
604

DETERMINE TO LOAD A PROCESS INTO THE FIRST VIRTUAL MEMORY ON BEHALF OF
A FIRST PROGRAM RUNNING IN THE FIRST VM
606

DETERMINE
WHETHER PROCESS IS
SHARABLE OR PRIVATE
608

PRIVATE          SHARABLE

LOAD THE PROCESS INTO A LARGE
PAGE OF A FIRST VIRTUAL ADDRESS
SPACE OF THE FIRST VIRTUAL MEMORY
610

LOAD THE PROCESS INTO A SMALL
PAGE OF THE FIRST VIRTUAL ADDRESS
SPACE
612

FIG. 6

DYNAMIC PAGE SIZE SELECTION FOR VIRTUAL MEMORY SHARING

BACKGROUND

Virtualization techniques increase the utilization of hardware resources of computing devices (e.g., central processing unit (CPU), memory, storage, etc.) by dividing the resources among different virtual computing resources. For example, a single device can host multiple instances of virtual machines (VM) (also referred to herein as "virtual machine instances" or "VM instances") that appear and operate as independent physical computing devices, but each share or are allocated portions of the computing resources of the underlying physical computing device. In this way, rather than having a single user or process under-utilize the resources of a physical computing device, multiple users or processes can utilize the resources of the physical computing device to increase resource utilization.

A thin layer of software, called a "hypervisor," decouples the VMs from the host device and dynamically allocates computing resources to each VM as needed. For instance, the hypervisor creates virtual address spaces for the virtual memory of each VM, and divides the virtual address spaces into chunks of memory called "pages." Virtual memory can be divided into different size pages, such as small pages (e.g., 4 kilobytes (KB)), large pages (e.g., 16 KB, 64 KB, etc.), and huge pages (e.g., 2 megabytes (MB)). The processor of the host device and its memory management unit (MMU) maintain a page table that maps pages in the virtual address spaces to hardware addresses in the device's physical memory. When a program's code accesses a virtual address in memory, the MMU uses the page table to translate the specified virtual address into the actual hardware memory address. This translation occurs automatically and is transparent to the running application. However, there can be some inefficiencies when using virtual memory, such as latencies caused by translating between virtual addresses to physical addresses.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates a flow diagram of an example method for a host device that runs multiple VMs, determines whether a process that is requesting memory is sharable or private, and loads the process into either small pages or large pages based on whether the process is sharable or private.

FIG. 4A illustrates a system flow diagram of example modes that a host device may transition between where the host device provides either small pages of memory or large pages of memory to processes running on the host device.

FIG. 4B illustrates a system flow diagram of example modes that a host device may transition between where the amount of shared memory in the physical memory decreases from the time at which multiple VMs are launched to a time when applications are running in the VMs.

FIG. 5 illustrates a flow diagram of an example method for a host device to load a private process into a large page of memory that maps to private memory, and to load a sharable process into a small page of memory that maps to shared memory.

FIG. 6 illustrates a flow diagram of an example method for a host device that runs multiple VMs to determine whether a process that is requesting memory is sharable or private, and loads the process into either small pages or large pages based on whether the process is sharable or private.

DETAILED DESCRIPTION

Figure 1:
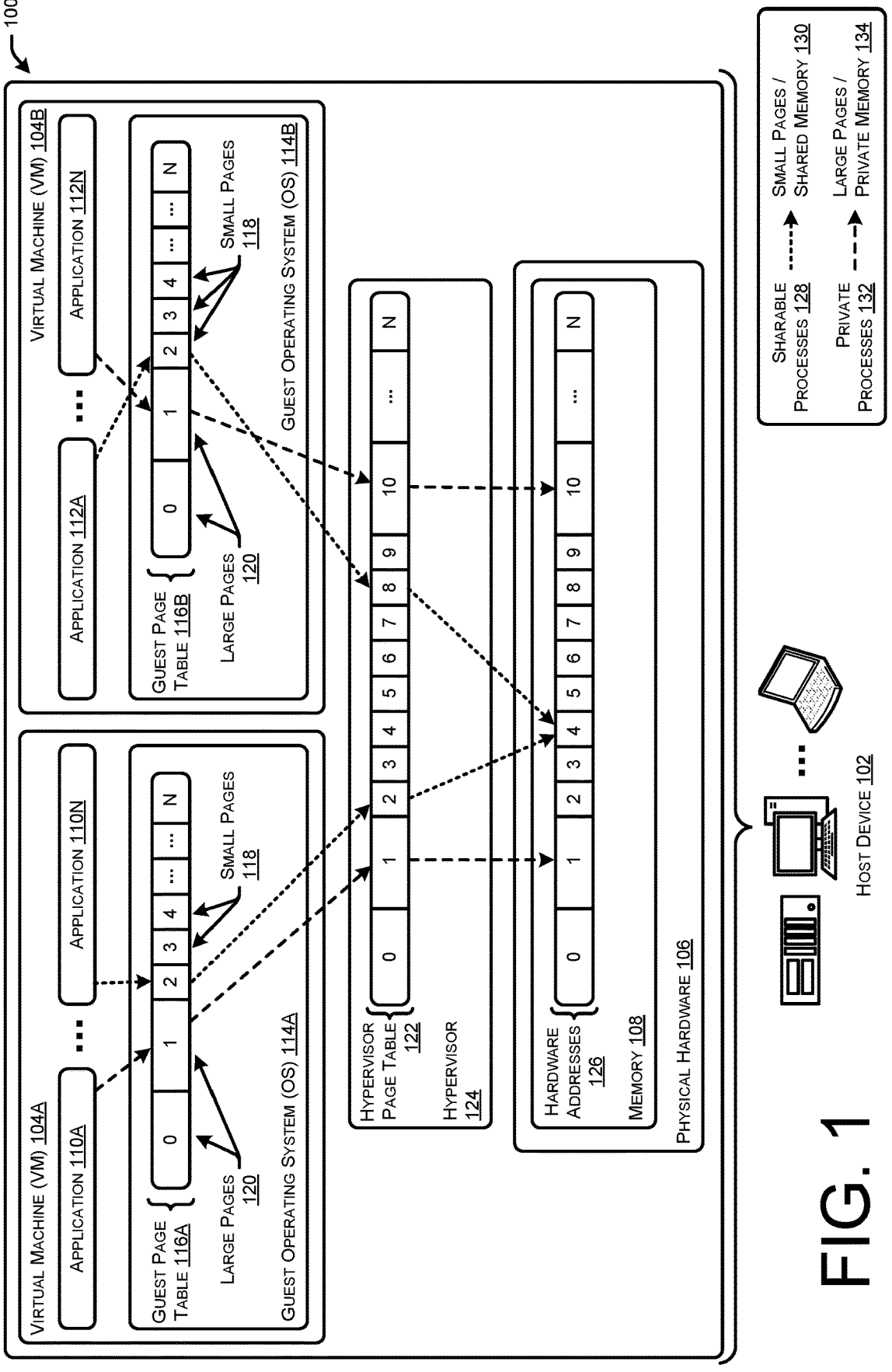
FIG. 1 illustrates a system-architecture diagram of an example environment in which a host device is running multiple VMs and manages its physical memory by selecting optimally sized pages of virtual memory for programs running in the VMs.

This disclosure describes techniques for more efficiently managing the memory of computing devices that host multiple VMs by selecting optimally sized pages of virtual memory for programs running in the VMs. Virtual memory of these host devices has traditionally been divided into pages of a single size (e.g., small, large, or huge) that are then offered to programs running in VMs. These page sizes have different benefits and draw backs, and selecting the best page size for virtual memory requires consideration of various factors. For example, small pages are useful because they increase the amount of memory that can be shared by the VMs, but they also result in an execution slowdown due to the hardware latency of translating virtual addresses to physical addresses. Conversely, large pages improve the execution performance by reducing the latency from address translation, but also limit the amount of memory that can be shared by the VMs. This disclosure describes using small pages for commonly used and sharable memory (e.g., VM images, operating system (OS) processes, etc.), and using large pages for private memory that runs private processes of the applications and cannot be shared (e.g., high-performance applications). This provides the high performance required by certain applications by providing large pages, but still allows for use of small pages to increase memory sharing and allow for efficient overcommitment of VMs on the host device.

Host devices can run multiple instances of VMs that are each provided with dedicated physical resources of the host devices, such as CPU, memory, and disk space. The hypervisor (also referred to herein as a "VMM") decouples the VMs from the host device and dynamically allocates computing resources to each VM as needed. Take memory as an example, the hypervisor creates virtual address spaces for the virtual memory of each VM, and divides the virtual address spaces into chunks of memory called pages. According to the techniques described herein, the virtual memory may have its virtual address space divided into different size pages, such as small pages, large pages, and huge pages. To map the virtual address space to a host physical address space, the hypervisor controls translations of the memory addresses and executes the translations using hardware components like the processor and its MMU. The MMU maintains an in-memory table of items called a "page table" to map pages in the virtual address spaces to hardware addresses in the device's physical memory.

When a program's code accesses an address in memory, the MMU uses the page table to translate the specified virtual address into the actual hardware memory address. The page tables of an MMU contain one page table entry (PTE) per page to map virtual page numbers to physical page numbers in main memory. An associative cache of PTEs is called a translation lookaside buffer (TLB) and is used to avoid the necessity of accessing the main memory every time a virtual address is mapped. The TLB is a memory cache that stores recent translations of virtual memory addresses to physical memory addresses, and generally helps reduce the time taken to access a memory location. Thus, if a program continues to access the same virtual memory addresses, the MMU does not need to translate the memory addresses because the translations are cached in the TLB. Due to this, it may be advantageous to use large or huge pages for virtual memory because the MMU will have to perform less translations. However, using large or huge pages reduces the amount of memory that can be shared between VMs which can put a strain on the amount of available memory of the host device. This may result in memory paging where data is stored and retrieved from secondary storage (e.g., disk storage), which can greatly increase the latency for storing and retrieving data. Being unable to efficiently share memory between VMs can be particularly problematic for host devices that are configured for memory overcommitment between the VMs.

Memory-overcommitted host devices are configured to allocate virtual memory amounts to the VMs that, in combination, may exceed the total amount of physical memory on the host device. Overcommitment is helpful because, typically, some of the VMs on a host device are lightly loaded and their allocated physical memory can be shared with other VMs that are heavily loaded. That is, physical memory that is allocated to a lightly loaded or idle VM can remain available to other heavily loaded VMs to drive up the overall utilization of physical memory by the VMs.

Small pages are also useful to help solve memory management issues, and can be particularly helpful for over-committed hosts. The use of small pages can result in higher amounts of physical memory being shared between the different VMs. Small pages increase the likelihood that we can share memory because it is more likely that the memory was not written to by processes, and we can reuse the physical memory again. There are various examples where this is particularly helpful, such as for VMs, containers, functions, etc., that are launched using snapshots or images. For example, a VM image contains data necessary to create and launch instances of a VM, and a VM snapshot is generally a full, read-only copy of a VM at a specific point in time. Often, host devices run VMs of a same type that are launched using the same VM images or snapshots. These data files may be read-only when being used to launch VMs, and can be shared by the processes running to launch the VMs. That is, virtual addresses of each of the VMs may map to the same hardware addresses where the VM image/ snapshot data has been loaded such that the processes are reading from, and sharing, the same physical memory. Thus, small pages and large/huge pages have respective advantages and drawbacks, and having to select one page size for memory forces the host device to experience the draw backs of the selected page size.

According to the techniques described herein, host devices may be configured to use or provide small pages for commonly used and sharable memory (e.g., VM images), and using large pages for private memory that cannot be shared and is frequently accessed (e.g., high-performance applications). This provides the high performance needed for certain applications by using large or huge pages, but still allows for using small pages to increase memory sharing and allow for efficient overcommitment of VMs on the host device. The techniques below are described as having a guest operating system (OS) of the VMs perform some of the functions described herein, but depending on the architecture of the host device, the techniques may be performed by one or more of a hypervisor, the MMU, and/or another component configured to manage memory of the host device.

The hypervisor may divide the virtual address spaces of the VMs into pools of differently sized pages, such as pools of small pages, pools of large pages, and/or pools of huge pages. The guest OS (and/or the requesting application/ program) may dynamically select and provide differently sized pages for loading processes based on the types of processes being loaded into memory. For instance, the guest OS may determine that a program is requesting memory to load a process that is considered or classified as sharable. For instance, the process may have an access mode of read-only, may be a snapshot or image file, or may otherwise be determined to be sharable between processes of different VMs. The guest OS may then determine to allocate one or more small pages to the program in which the process may be loaded. The virtual pages may map to a hardware address or memory location that may also be mapped to, and shared by, a virtual page of a different VM that would like to run the same process or obtain the same data. On the other hand, the guest OS may instead determine that a program is requesting memory to load a process that is considered or classified as private. For instance, the process may be determined to be private in that it is specific to an application or program running in the VM, has an access mode of read-write, or otherwise maps to private memory. The guest OS may then determine to allocate one or more large or huge pages to the program in which the private process may be loaded. In this way, processes that are sharable may be loaded into small pages to increase memory sharing, and processes that are private may be loaded into large or huge pages to gain performance benefits for the application.

In some instances, the guest OS may transition between modes in which the guest OS allocates small pages versus large/huge pages. For instance, at the beginning of a life-cycle of one or more VMs (e.g., launching new VMs), containers, and/or functions, the guest OS may be in a "launch mode" in which the guest OA allocates small pages to processes. In this way, the data of the image or snapshot of the VMs may be loaded into small pages because the snapshot and/or image is sharable between VMs. However, once the VMs have started running one or more applications, the applications will start writing to memory and data will change overtime so the amount of memory that can be shared between VMs will decrease. Accordingly, the guest OS may transition from the launch mode into a "perfor-mance mode" in which the guest OS provides large or huge pages in which to load processes for the applications.

The techniques described herein may be performed on any computing device, or system of devices, configured to host multiple instances of virtual computing resources. While the techniques are described with respect to VMs, the techniques could be equally applied to containers or other virtualization technologies that are configurable for memory sharing. For example, the techniques are generally applicable to any type of virtual computing resource that is allocated underlying portions of physical computing resources and executes within a virtual machine, or independently executes on the physical computing resources. Such virtual computing resources can include a container executing on a physical resource, a virtual machine instance running one or more containers, a serverless function running on a VM and/or container, processes, software, and/or any other executable that is allocated portions of physical computing resources.

In some instances, the host devices may be servers that are located in data centers of service provider networks, such as cloud networks, that are managed by service providers. Service providers offer various network-based (or "cloud-based") services to users to fulfill computing needs of the users. These service providers may operate service provider networks that include clusters of managed servers (or other hardware-based computing devices) stored in data centers located across different geographic regions. A user of the service provider network can request that the service provider allocate computing resources in these data centers to support computing workloads on behalf of the users. One or more services of the service provider network can receive these requests and allocate physical computing resources to support the workloads, such as usage of computer processors, memory, storage drives, computer network interfaces, and/or other hardware resources of a computing device, for the user. As used herein, computing resources refers to compute (e.g., CPU), memory, storage (e.g., disk), networking (e.g., network I/O, bandwidth, etc.), and, in some implementations, graphics processing (e.g., GPU).

The service provider networks may utilize virtualization technologies as described herein to enable servers or other host devices to host multiple VM instances that appear and operate as independent computing devices to support workloads of users. Rather than allocating all of the computing resources of a physical computing device to support a single workload, the computing resources of a physical computing device can be allocated amongst multiple VM instances that support different workloads. The service provider network supports many different types of workloads on behalf of users, and these workloads often have different computing resource needs. As described herein, a workload is implemented by a designated set of computing resources and the workload itself can be considered as code or logic that performs functionality using the computing resources. Workloads may be application or programs, or may support applications or programs, running on behalf of users. The service provider networks may offer and manage memory-overcommitted host devices to users that utilize the techniques described herein.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a host device 102 is running multiple VMs 104A and 104B and manages its physical memory 108 by selecting optimally sized pages of virtual memory for programs running in the VMs 104.

The host device 102 may comprise any type of device capable of being configured using virtualization technologies, such as by running VMs, containers, etc. The host device 102 may comprises one or more of personal user devices (e.g., desktop computers, laptop computers, phones, tablets, wearable devices, entertainment devices such as televisions, etc.), network devices (e.g., servers, routers, switches, access points, etc.), sensors, Internet-of-Thing (IoT) devices, data centers, application infrastructures, and/ or any other type of computing device.

The host device 102 may include physical hardware 106 that includes various hardware computing resources, such as processor computing power/capacity, read-only and/or random-access memory, data storage and retrieval systems, device interfaces such as network or peripheral device connections and ports, and the like. In some embodiments, these physical hardware components 106 of the host device 102 may implement or communicate with a virtualization layer and corresponding virtualization systems (e.g., a hypervisor, VMM, guest OS, etc.), whereby the compute resources are represented by, and made accessible as, virtual computing resources, such as instances of virtual computing resources. A virtual computing resource may be a logical construct, such as a data volume, data structure, file system, and the like, which corresponds to certain compute resources. Non-limiting examples of virtual computing resources include virtual machines 104, containers, logical data storage volumes capable of storing files and other data, serverless functions, software programs, data processing services, and the like.

In this illustrative example, the host device 104 is hosting at least two VMs 104A and 104B, but in some instances additional VMs 104 may be running on the host device 102. These VMs 104 may emulate the host device 102 in order to operate and support workloads, such as by having their own operating systems (or "guest OSes"), processing capabilities, storage capacity, and network connections or interfaces. The VMs 104 may be allocated dedicated physical hardware resources 106 of the host device 102, such as CPU, memory 108, and disk space. A hypervisor 124 (also referred to herein as a "VMM") is a thin layer of software that decouples the VMs 104 from the host device 102 and dynamically allocates computing resources to each VM 104 as needed.

In a virtual execution environment including multiple VMs 104, memory virtualization involves sharing the physical memory 108 in RAM and dynamically allocating it to the physical memory of the VMs 104. Thus, each VM 104 will be allocated its own portion of physical memory of the underlying memory 108. This structure may result in a two-stage mapping or translation process as described below. Although illustrated as a two-stage translation process, the techniques are equally applicable for a single stage mapping (e.g., virtual memory directly to physical memory), or for multi-stage translations of memory greater than two. For example, the VMs 104 may run respective VMs as nested VMs such that additional layers or stages of translation are managed according to the techniques described herein.

Each VM 104 may run a respective guest OS 114 that manages a guest page table 116 where the guest page table 116 maps virtual memory of that specific VM 104 to the physical memory allocated to the VM 104. As shown by the guest page tables 116, the virtual memory of each VM 104 may be divided into chunks of memory called pages (represented in a hypervisor page table 122). The virtual memories for each VM 104 have their own virtual address space, shown by the guest page tables 116, that can be divided into different size pages, such as small pages 118 and large pages 120. As described herein, large pages may include "huge pages" as well, or any page size larger than a small page. Generally, small pages may be approximately 4 kilobytes in size (or 4 kibibytes (KiB), large pages may include pages sized at 16 KB, 64 KB, etc., and huge pages may be approximately in a range of 1-2 MB (or 1-2 mebibytes MiB)).

Generally, the hypervisor 124 may divide the virtual memory into address spaces, or page tables, using various techniques. For instance, the hypervisor 124 may create a statically defined set of small pages 118 and large pages 120 such that the physical memory 108 always has a number of small pages 118 and large pages 120. In some instances, the hypervisor 124 may dynamically change the number of small pages 118 and large pages 120 of the physical memory 108 (and virtual tables) based on needs of the applications 110/112 or other processes using the memory 108. That is, the hypervisor 124 may dynamically increase or decrease the number of large pages 120 and/or small pages 118 based on the types and numbers of processes being loaded into memory 108.

The guest page table 116 may be divided into small pages 118 and large pages 120 that are allocated or provided to applications 110 and 112 (or other programs) running in the VMs 104A and 104B. Generally, the guest OS 114 of each VM 104 may manage the guest page tables 116 and control the mapping of guest virtual addresses (GVAs) to the guest physical memory addresses (GP As) allocated to the VMs 104. The guest OSes 114 may perform at least some of the techniques described herein, such as determining types of processes that are requesting access to virtual memory of the VM 104 and dynamically selecting between small pages 118 or large pages 120 for the processes based on the types of processes.

However, the guest OSes 114 do not have direct access to the actual machine memory 108 of the host device 102. Rather, the hypervisor 124 is responsible for mapping the guest physical addresses to the actual machine memory addresses of the memory 108. The hypervisor page tables 122 are used by the hypervisor 124 to map the guest physical addresses of each VM 114 to the actual hardware addresses 126 of the memory 108. Thus, there may exist a two-stage mapping processes performed by the guest OSes 114 and the hypervisor 124 where the guest OSes 114 use the guest page tables 116 to translate from guest virtual memory to guest physical memory, and the hypervisor 124 uses the hypervisor page tables 122 to translate the guest physical memory to the hardware addresses 126 of the machine memory 108.

In some instances, each guest page table 116 may have a separate hypervisor page table 122 that is called a shadow page table. Generally, an MMU (not illustrated) handles the virtual-to-physical translations as defined by the guest OSes 114, and then the physical memory addresses are translated to machine addresses using the set of hypervisor page tables 122 defined by the hypervisor 124 (the hypervisor). In some examples, however, the processors of the host device 102 may use a TLB to map the virtual memory directly to the machine memory to avoid the two levels of translation on every access. When the guest OSes 114 change the virtual memory to a physical memory mapping, the hypervisor 124 updates the shadow page tables 122 to enable a direct lookup. As shown, the small pages 118 in the guest page tables 116 map to small pages in the hypervisor page tables 122, which in turn map to small segments or address spaces of the hardware addresses 126. Similarly, the large pages 120 in the guest page tables 116 map to large pages 120 in the hypervisor page tables 122, which in turn map to large segments or address spaces of the hardware addresses 126.

According to the techniques described herein, components of the host device 102 may be configured to use or provide small pages 118 for commonly used and sharable memory 108 (e.g., VM images or snapshots, OS functions, etc.)), and using large pages 120 for private memory 108 that cannot be shared (e.g., high-performance applications 110). This provides the high performance needed for certain applications 110 by using large/huge pages 120, but still allows for using small pages to increase memory sharing and allow for efficient overcommitment of VMs on the host device. Some of the techniques are described as having the guest OSes 112 perform some of the functions described herein, but depending on the architecture of the host device 102, the techniques may be performed by one or more of a hypervisor/VMM 124, a host OS of the host device 102 the MMU, and/or another component configured to manage memory 108 of the host device 102.

In some embodiments, the guest OSes 114 (and/or the requesting application/program) may dynamically select and provide differently sized pages for loading processes based on the types of processes being loaded into memory. For instance, the guest OS 114 may determine that an application 110 is requesting memory to load a process that is considered or classified as sharable, or sharable process 128. For instance, sharable process 128 may have an access mode of read-only, may be a snapshot or image file, or may otherwise be determined to be sharable between processes of different VMs 104. The guest OS 114 may then determine to allocate one or more small pages 118 to the application 110 in which the sharable process 128 may be loaded. The small page(s) 118 may be mapped to a guest physical address that the hypervisor 124 then used the hypervisor page tables 122 to map to a hardware address 126 or memory location that may also be mapped to, and shared by, a small page 118 of a different VM 104 that would like to run the same process or obtain the same data (e.g., shared memory 130).

Further, the guest OS 114 may determine that multiple application 110 and 112 are requesting memory to load respective processes that are considered or classified as private. For instance, the private processes 132 may be determined to be private in that they are specific to applications 110/112 or program running in the VMs 104, have access modes of read-write, or otherwise map to private memory 108. The guest OS 114 may then determine to allocate one or more large pages 120 to each of the applications 110 and 112 in which the private processes 132 may be loaded. The large pages 120 may be mapped to guest physical addresses that the hypervisor 124 then used the hypervisor page tables 122 to map to hardware addresses 126 or memory locations that are in private memory 134 of the memory 108. In this way, processes that are sharable may be loaded into small pages 118 to increase memory sharing, and processes that are private may be loaded into large pages 120 to gain performance benefits for the applications 110/112.

In an example embodiment, the host device 102 may be one of a plurality of host devices 102, such as servers, that may be located in server racks in data centers of a service provider network. The service provider network may be operated and/or managed by a service provider may provide various services to users to fulfil their computing resource needs, such as cloud-based computing resources. For example, the service provider network may provide cloud-based, scalable, and network accessible compute power services, storage services, database services, and/or other services. Users may subscribe for use of the computing resources and/or services provided by the service provider network. The service provider network may include, manage, own, or otherwise be associated with a computing-resource network that is comprises of a network of data centers.

The service provider network and computing-resource network may span across different geographic regions, and include or be associated with includes clusters of managed host devices 102 (e.g., servers) stored in data centers located across the different geographic regions. In this way, users who have subscribed for use of the network-based services supported by computing resources in the data centers need not invest in and maintain the computing infrastructure required to implement the various services that they may need. In some examples, users of the service provider network may access or utilize computing resources of the servers (and/or any computing device) in the data centers located in different geographic regions such that users located in these different geographic regions are provided with access these resources and services.

The host device 102 may be one of a plurality of host devices 102, such as servers, that provide various types of computing resources, such as compute (CPU) resources (e.g., central processing units (CPUs) for processing data), memory resources (e.g., physical devices capable of storing information such as RAM or ROM), storage resources (e.g., disk storage or drive storage used to store data by various electronic, magnetic, optical, or mechanical changes to a surface layer of one or more rotating disks), graphics compute (GPU) resources (e.g., graphics processing units (GPUs)), and/or network throughput resources (e.g., average or measured rate of bit transmission per second over networks). The servers may be various types of computing devices, such as devices that have different chip set generations, are from different vendors, have different hardware architectures, and so forth.

Figure 2:
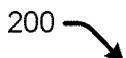
FIG. 2 illustrates a component diagram of a host device that hosts multiple VMs and selects optimally sized pages of virtual memory to increase both memory sharing and performance for programs running in the VMs.

FIG. 2 illustrates a component diagram 200 of a host device 102 that hosts multiple VMs 104 and selects optimally sized pages of virtual memory to increase both memory sharing and performance for programs running in the VMs.

As illustrated, the host device 102 may include one or more central processing units (CPUs) 202, one or more communication interfaces 204, and memory 108 to store and/or help execute the various services described above. The CPU(s) 202 may be hardware processors (processors) configured to execute one or more stored instructions. The CPU(s) 202 may each include one or more cores and processor cache(s). The one or more communication interfaces 204 may provide communications between the host devices and other devices, such as devices with which the applications 110/112 desire to communicate, other devices in network of the host device 102, etc. The communication interfaces 204 may include devices configured to couple to personal area networks (PANs), wired and wireless local area networks (LANs), wired and wireless wide area networks (WANs), and so forth. For example, the communication interfaces 204 may include devices compatible with Ethernet, Wi-Fi, and so forth. By way of example, and not limitation, memory 108 may be computer-readable media and can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As further shown, the host device 102 may include an MMU 206 that includes or is associated with a TLB 208. The MMU 206 may help perform translation of virtual memory addresses to physical, hardware addresses. In some instances, the translations may be controlled by a hypervisor 124 (or VMM) that instructs or controls the translations performed by the MMU 206. The MMU 206 may use the hypervisor page tables 122, and/or other page tables, to map guest physical memory addresses to hardware addresses 126 of the machine memory 108. In some instances, the MMU 206 may work in conjunction with the TLB 208 to perform the translations. The TLB 208 may comprise a memory cache that stores the recent translations of virtual memory to physical memory, and reduces the time taken to access a memory location. The TLB 208, or "address-translation cache" may be part of the MMU 206 and reside between the CPU(s) 202 and the CPU cache. The TLB 208 may be queried for search results where the key is the virtual address, and the search result is the corresponding physical address. If the requested virtual address is present in the TLB 208, the search yields a match quickly and the retrieved physical address can be used to access memory. This is called a TLB hit. If the requested address is not in the TLB, it is a miss, and the translation proceeds by looking up the page table in a process called a page walk.

Further, the host device may include secondary storage 212, such as disk storage. The secondary storage 212 may record data using various electronic, magnetic, optical, or mechanical changes to a surface layer of one or more rotating disks. A disk drive is a device implementing such a storage mechanism. Various types of disk drives exist, such as the hard disk drive (HDD) containing a non-removable disk, the floppy disk drive (FDD) and its removable floppy disk, and various optical disc drives (ODD) and associated optical disc media. The secondary storage 212 may be used as fallback storage for examples where the memory 108 is overloaded, particularly for memory-overcommitted host devices 102.

In addition to the components discussed in FIG. 1, the memory 108 may further store and/or execute a host OS 210. The host OS 210 communicates and manages the underlying physical hardware 106 of the host device 102, and runs the hypervisor/VMM 124 to enable virtualization on the host device 102. The host OS may perform some of the operations described herein associated with managing virtual memory and/or physical memory. According to one embodiment, the host OS and guest OSes 114 may comprise one or more of the LINUX operating system, the WINDOWS SERVER operating system from MICROSOFT Corporation of Redmond, Washington. According to further embodiments, the operating system(s) can comprise the UNIX operating system or one of its variants. It should be appreciated that other operating systems can also be utilized.

FIG. 3 illustrates a flow diagram of an example method 300 for a host device 102 that runs multiple VMs 104, determines whether a process that is requesting memory is sharable or private, and loads the process into either small pages 118 or large pages 120 based on whether the process is sharable or private.

At 302, the host OS 210 and/or hypervisor 124 allocates virtual memory to VMs 104 running on the host device 102. For instance, the host OS 210 and/or hypervisor 124 may decide portions of physical memory 108 that are dedicated for use of each of the VMs 104. In some instances, host device 104 may be memory overcommitted. That is, the host OS 210 and/or hypervisor 124 may reserve a first portion of the physical memory 108 for use by the first VM 104A, and reserve a second portion of the physical memory 108 for use by the second VM 104B where the first portion and the second portion at least partially overlap such that the physical memory 108 is overcommitted.

At 304, the host OS 210 and/or hypervisor 124 may divide address spaces of the VMs 104 into sets of small pages 118 and sets of large pages 120. That is, each guest page table 116 of the VMs 104 may have each have small pages 118 and large pages 120 that can be selectively provided to processes in which to execute.

At 306, one or more applications 110/112 may run on each of the VMs 104. The applications 110/112 may be any type of program or software that can run in virtual environments, such as workloads, cloud-native applications, third-party applications, general software, custom software, etc.

At 308, a guest OS 114 of a VM 104 may receive a request from an application 110 to load a process (e.g., executable data or file) into virtual memory of the VM 104. At 310, the guest OS 114 (and/or another component) may determine whether the process is sharable or private. For instance, the guest OS 114 may determine whether access to the file associated with the process is read-only (sharable) or read-write (private). As another example, the guest OS 114 may determine what the process is, such as an operating system process (sharable), a common VM image or snapshot (sharable), or a process that is specific to the application (private).

In response to determining that the process is sharable, the guest OS 114 may, at 312, load the process into a small page 118, or provide the application 110 with access to the small page 118, where the small page is ultimately mapped to shared memory of the physical memory 108 that can be shared with processes of the other VM 104. Conversely, at 314, the guest OS 114 may load the process into a large page 120, or provide the application 110 with access to the large page 120, where the large page 120 is ultimately mapped to private memory of the physical memory 108 that cannot be shared with other processes in other VMs 104.

FIG. 4A illustrates a system flow diagram 400 of example modes that a host device 102 may transition between where the host device 102 provides either small pages 118 of memory 108 or large pages 120 of memory 108 to processes running on the host device 102.

Components of the host device 102 that allocate memory may enter into a launch mode 402 based on various events. For instance, if the host device 102 is coming online in a network and launching VMs 104, or is otherwise determining to launch one or more VMs 104 or other sharable files, the host device 102 may enter into the launch mode 402. During the launch mode 402, the guest OSes 114 may allocate small pages 118 to processes as it is likely the processes are sharable. In this way, the data of the image or snapshot 406 of the VMs 104 may be loaded into small pages 118 because the snapshot and/or image is sharable between VMs 104, and those small pages 118 may be mapped to sharable memory. The components of the host device 102, such as the guest OSes 114, host OS 210, hypervisor 124, and/or other components that allocate and map memory, may be in the launch mode 402 while the host device 102, at "1", determines to launch VMs 104 on the host device 102, at "2", launches a VM snapshot or image into shared memory of small pages 118, and at "3", the VMs 104 complete their launch. In some instances, the launch mode 402 may be utilized for processes other than just VMs 104 that may share memory. For instance, the host device 102 may simultaneously, or concurrently, launch containers from the same images or snapshots, serverless functions from the same images or snapshots, or other processes in the launch mode 402 that may benefit from sharing small pages 118.

As described herein, an image (e.g., VM image, container image, serverless function image, etc.) may be an executable image file from which a virtual resource can be built, and that is stored in a unique storage format. Further, a snapshot of a virtual resource records the state and data of the virtual machine at a moment the snapshot was taken. That is, a snapshot is a complete duplicate of the virtual resource (e.g., VM, container, etc.) that may be used for migration or to create numerous instances of the same virtual resource. In some instances, a snapshot may be stored as an image and executed to build the virtual resource as an image.

Once the VM(s) 104 (or other processes) have started running and programs/applications 110/112, the applications 110/112 will start writing to memory and data will change overtime so the amount of memory that can be shared between VMs 104 will decrease. Accordingly, the guest OSes 114 and/or other components may transition from the launch mode 404 into a performance mode 406 in which the guest OSes 114 provide large pages 120 in which to load processes. That is, because the VMs 104 are finished being launched and are running applications 110/112, it is more likely that the processes that are requesting memory will be private processes or files that cannot share memory, and will benefit from the high performance provided by large pages 120.

Although the guest OSes 114 and/or other components generally provide access to, or otherwise allocate, small pages 118 in the launch mode 402 and large pages 120 in the performance mode 404, the guest OSes 114 and/or other components may still be able to selectively provide large pages 120 in the launch mode 402 and small pages 118 in the performance mode 404.

FIG. 4B illustrates a system flow diagram 400 of example modes that a host device 102 may transition between where the amount of shared memory in the physical memory decreases from the time at which multiple VMs are launched to a time when applications are running in the VMs 104 and using the physical memory.

As described in FIG. 4A, the components of the host device 102 may transition between a launch mode 402 into a performance mode 404, and potentially back-and-forth depending on what is occurring on the host device 102 (e.g., additional VMs 104 are launching, containers are being launched from a common image/snapshot, serverless functions are being executed across VMs 104 using a same file or image, etc.). At different times, T1, T2, and T3, the amount of shared memory 130 versus private memory 136 changes. As shown, the hardware addresses 126A at T1 are primarily small pages 118 mapped to shared memory 130. Thus, in the launch mode 402 during T1, the physical memory 108 will be primarily shared memory 130 with small pages 118. At T2, as the components of the host device 102 are near, or are, transitioning from the launch mode 402 into the performance mode 404, the hardware addresses 126B of the memory 108 start to transition to roughly split between small pages 118 and shared memory 130 into large pages 120 and private memory 136. That is, as the small pages 118 used to run the sharable files or processes are no longer being used, the guest OSes 114 and/or other components re-segment the hardware addresses 126B into the sizes of large pages 120. Finally, at T3, the hardware addresses 126C is primarily populated by private process running in large pages 120 of private memory 136. Thus, T3 may be representative of a time when the components of the host device 102 have transitioned into the performance mode 404.

It should be noted that the hardware addresses 26 shown in FIG. 4B illustrated the amount of memory being used, and not the total memory. That is, there may be hardware addresses 126 that are unused and available/empty that are not shown in FIG. 4B. Rather, FIG. 4B is meant to illustrate the hardware addresses 126 that are not being used or are available.

FIGS. 5 and 6 illustrate flow diagrams of example methods 500 and 600 that illustrate aspects of the functions performed at least partly by the host device 102 as described in this disclosure. The logical operations described herein with respect to FIGS. 5 and 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5 and 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components. As described herein, a virtual computing resource may comprise one or more of a VM instance, a virtual container, a program, and/or any other virtual representation FIG. 5 illustrates a flow diagram of an example method 500 for a host device 102 to load a private process 132 into a large page 120 of memory that maps to private memory 134, and to load a sharable process 128 into a small page 118 of memory that maps to shared memory 130. The host device 102 may include one or more processors (e.g., CPU(s) 202) and physical memory 108 comprising shared memory configured to be shared among multiple processes, and private memory configured for use by individual processes to which it is allocated. Further, the physical memory 108 stores computer-executable instructions (e.g., one or more of host OS 2120, hypervisor 124, guest OSes 114, etc.) that, when executed by one or more processors, cause the one or more processors to perform operations of method 500.

At 502, the host device 102 may allocate, to a first virtual machine (VM) running on the computing device, first virtual memory that corresponds to a first portion of the physical memory. For instance, the hypervisor may allocate a first portion of the physical memory 108 to a first VM 104A running on the host device 102.

At 504, the host device 102 may allocate, to a second VM running on the computing device, second virtual memory that corresponds to a second portion of the physical memory. For instance, the hypervisor may allocate a second portion of the physical memory 108 to a second VM 104B running on the host device 102. However, any number of VMS 104 may be running on the host device 102.

At 506, the host device 102 may divide a first virtual address space of the first virtual memory into first small pages and first large pages, where the first small pages map to the shared memory and the first large pages map to the private memory. In some instances, there may be a static number of first small pages 118 and first large pages 120, and in other examples, the number of first small pages 118 and first large pages 120 may be dynamic in that the hypervisor 124 changes the number based on numbers of shared versus private processes running on the host device 102.

At 508, the host device 102 may divide a second virtual address space of the second virtual memory into second small pages and second large pages, wherein the second small pages map to the shared memory and the second large pages map to the private memory. In some instances, there may be a static number of second small pages 118 and second large pages 120, and in other examples, the number of second small pages 118 and second large pages 120 may be dynamic in that the hypervisor 124 changes the number based on numbers of shared versus private processes running on the host device 102.

In some examples, the first small pages and second small pages have respective page sizes of approximately 4 kilobytes (KB), and the first large pages and second large pages have respective page sizes within a range of approximately 16 KB to 1 gigabyte (GB). However, the small pages and large pages can have different sizes depending on the virtualization technologies being used as long as large pages 120 are larger than small pages 118.

At 510, the host device 102 may determine to load a first process into the first virtual memory on behalf of a first program running in the first VM, the first process being a private process. For instance, an application 110 running on the VM 104A may request memory 108 to load a private process.

At 512, the host device 102 may, based on the first process being the private process, load the first process into a first large page of the first virtual address space. That is, the private process may be loaded into a large page 120 to gain performance efficiencies and to map to private memory 108 that is not sharable.

At 514, the host device 102 may determine to load a second process into virtual memory on behalf of a second program running in the first VM where the second process is a shared process. For instance, the second process may be a guest OS 114 process, a container process, a serverless function process, and/or any other process that may be sharable.

At 514, the host device 102 may, based on the second process being the shared process, load the second process into a first small page of the first virtual address space. In such examples a hardware address 126 of the physical memory 108 to which the first small page maps 118 is shared with a second small page 118 in the second virtual address space 116/122.

FIG. 6 illustrates a flow diagram of an example method 600 for a computing device 102 that runs multiple VMs 104 to determine whether a process that is requesting memory is sharable or private, and loading the process into either small pages 118 or large pages 120 based on whether the process is sharable or private. The computing device 102 may include one or more processors (e.g., CPU(s) 202) and physical memory 108 comprising shared memory configured to be shared among multiple processes, and private memory configured for use by individual processes to which it is allocated. Further, the physical memory 108 stores computer-executable instructions (e.g., one or more of host OS 2120, hypervisor 124, guest OSes 114, etc.) that, when executed by one or more processors, cause the one or more processors to perform operations of method 500.

At 602, the computing device may run a first virtual machine (VM) where the first VM has first virtual memory that corresponds to a first portion of physical memory of the computing device. For instance, a host device 102 may run a first VM 104A where that VM 104A has respective virtual memory that corresponds to a first portion of the memory 108.

At 604, the computing device may run a second VM where the second VM has second virtual memory that corresponds to a second portion of the physical memory. For instance, the host device 102 may run a second VM 104B where that VM 104B has respective virtual memory that corresponds to a second portion of the memory 108.

In some instances, the host device 102 (components running thereon) may reserve the first portion of the physical memory 108 for use by the first VM 104A, and reserve the second portion of the physical memory 108 for use by the second VM 104B where the first portion and the second portion at least partially overlap such that the physical memory 108 is overcommitted.

At 606, the computing device may determine to load a process into the first virtual memory on behalf of a first program running in the first VM. For instance, the a guest OS 114 may receive a request for memory to be provided to the first program 110 running in the first VM 104A

At 608, the computing device may determine whether the process is private to the first program or sharable with a second program running in the second VM. For instance, the guest OS 114 and/or hypervisor 124 may determine a file type used to run the process and determine whether the process is private or specific to the application 110, or if the file type indicates that the process is sharable (e.g., VM image/snapshot, container image, serverless function image, OS process, etc.).

At 610, the computing device may, in response to determining that the process is private, load the process into a large page of a first virtual address space of the first virtual memory. For instance, if the process is private, the guest OA 114A may provide a large page 120 to the application 110 to run the private process.

At 612, the computing device may, in response to determining that the process is sharable, load the process into a small page of the first virtual address space. For instance, if the process is shared, the guest OA 114A may provide a small page 118 to the application 110 to run the shared process. In such examples, a hardware address 126 of the physical memory 108 to which the first small page 118 maps is shared with a second small page 118 in a second virtual address space of the second virtual memory.

Figure 7:
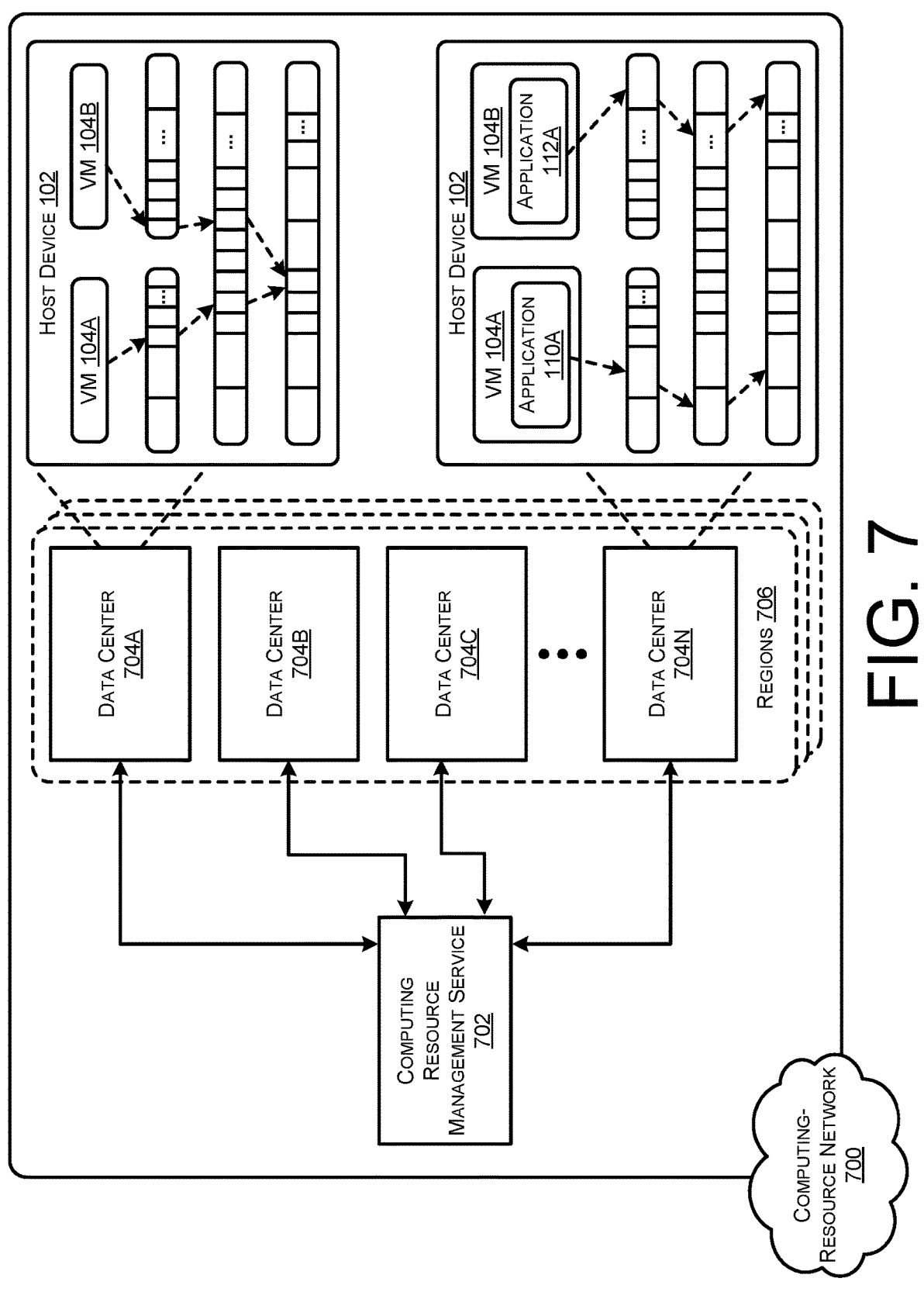
FIG. 7 is a system and network diagram that shows an illustrative operating environment that includes data centers of a service provider network that can be configured to implement aspects of the functionality described herein.

FIG. 7 is a system and network diagram of a computing-resource network 700 that shows an illustrative operating environment that includes data centers 704 in one or more regions 706 of a service provider network that can be configured to implement aspects of the functionality described herein. The computing-resource network 700 can provide computing resources, like VM instances and storage, on a permanent or an as-needed basis. Among other types of functionality, the computing resources provided by the computing-resource network 700 may be utilized to implement the various services described above. As also discussed above, the computing resources provided by the computing-resource network 700 can include various types of computing resources, such as data processing resources like VM instances, data storage resources, networking resources, data communication resources, network services, and the like.

Each type of computing resource provided by the service provider network can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The computing-resource network 700 can also be configured to provide other types of computing resources not mentioned specifically herein.

The computing resources provided by the computing-resource network 700 may be enabled in one embodiment by one or more data centers 704A-704N (which might be referred to herein singularly as "a data center 704" or in the plural as "the data centers 704"). The data centers 704 are facilities utilized to house and operate computer systems and associated components. The data centers 704 typically include redundant and backup power, communications, cooling, and security systems. The data centers 704 can also be located in geographically disparate locations, or regions 706. One illustrative embodiment for a data center 704 that can be utilized to implement the technologies disclosed herein will be described below with regard to FIG. 8.

The data centers 704 may be accessible over any wired and/or wireless network(s), which can be a wide area communication network ("WAN"), such as the Internet, an intranet or an Internet service provider ("ISP") network or a combination of such networks. For example, and without limitation, a user of the computing-resource network 700 may access the computing-resource network 700 by way of the network(s). It should be appreciated that a local-area network ("LAN"), the Internet, or any other networking topology known in the art that connects the data centers 704 to remote clients and other users can be utilized. It should also be appreciated that combinations of such networks can also be utilized.

The data centers 704 may include one or more of the host devices 102, and at least one of the host devices 102 may be configured to dynamically select optimal page types for processes running on VMs that are hosted in the host device 102.

Figure 8:
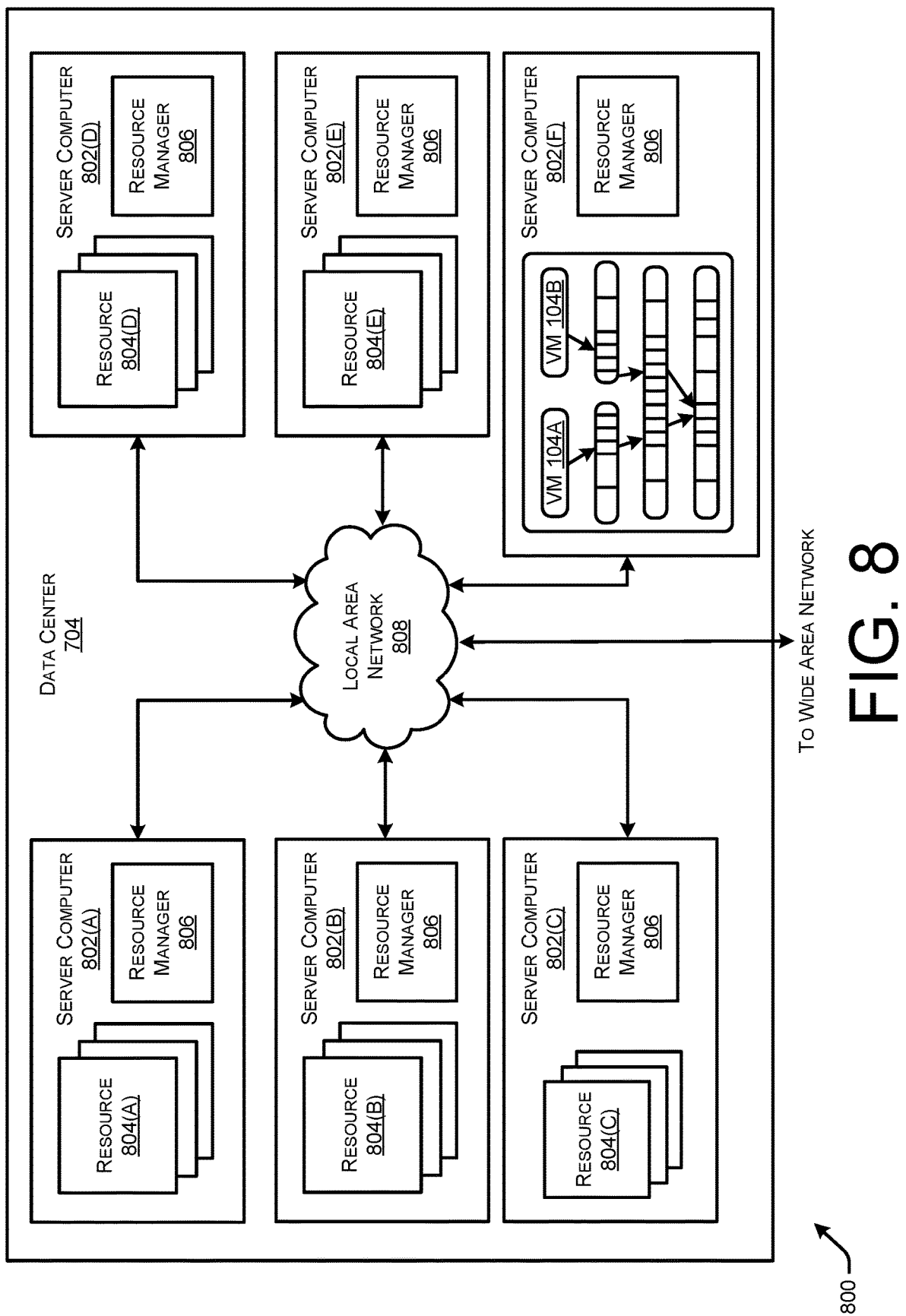
FIG. 8 is a computing system diagram illustrating a configuration for a data center that can be utilized to implement aspects of the technologies disclosed herein.

FIG. 8 is a computing system diagram 800 that illustrates one configuration for a data center 704 that implements aspects of the technologies disclosed herein. The example data center 704 shown in FIG. 8 includes several server computers 802A-802F (which might be referred to herein singularly as "a server computer 802" or in the plural as "the server computers 802") for providing computing resources 804A-804E. In some examples, the resources 804 and/or server computers 802 may include, be included in, or correspond to, the host devices 102 described herein.

The server computers 802 can be standard tower, rackmount, or blade server computers configured appropriately for providing the computing resources described herein (illustrated in FIG. 8 as the computing resources 804A-804E). As mentioned above, the computing resources provided by the computing-resource network 700 can be data processing resources such as VM instances or hardware computing systems, database clusters, computing clusters, storage clusters, data storage resources, database resources, networking resources, and others. Some of the servers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 704 can also be configured to provide network services and other types of services.

In the example data center 704 shown in FIG. 8, an appropriate LAN 808 is also utilized to interconnect the server computers 802A-802F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 704A-704N, between each of the server computers 802A-802F in each data center 704, and, potentially, between computing resources in each of the server computers 802. It should be appreciated that the configuration of the data center 704 described with reference to FIG. 8 is merely illustrative and that other implementations can be utilized.

The data center 704 shown in FIG. 8 also includes a server computer 802F that can execute some or all of the software components described above. For example, and without limitation, the server computer 802F (and the other server computers 802) can generally be included in the host device 102 of FIG. 1 and be configured to execute components, including the components of the host device 102, and/or the other software components described above. The server computer 802F can also be configured to execute other components and/or to store data for providing some or all of the functionality described herein. In this regard, it should be appreciated that the services illustrated in FIG. 8 as executing on the server computer 802F can execute on many other physical or virtual servers in the data centers 704 in various embodiments.

As shown, the data center 704 may include server computers 802 that may be one of the host devices 102 described herein that dynamically select page sizes for processes, programs, applications, etc., running in VMs that are hosted on the servers 802.

Figure 9:
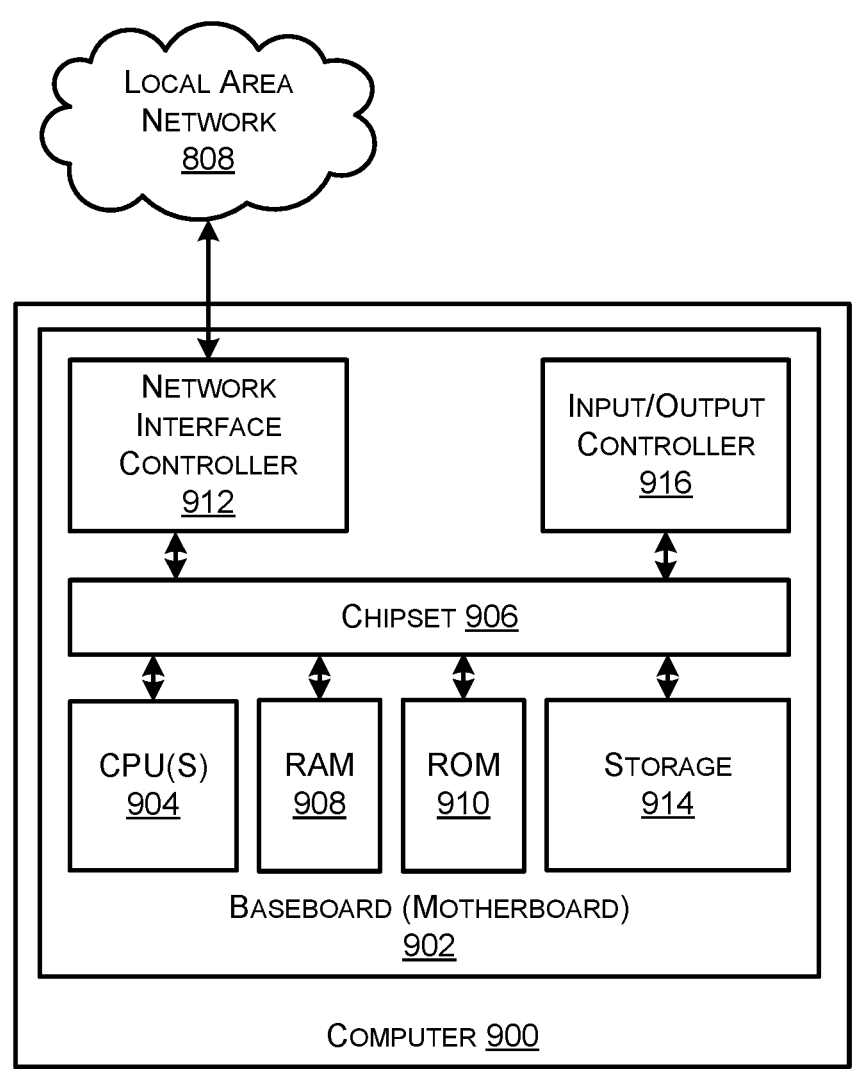
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein. In some examples, the server computer 900 may correspond to, or be the same as or similar to, a host device 102 described in FIGS. 1-6.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adderssubtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 808. The chipset 906 can include functionality for providing network connectivity through a network interface controller (NIC) 912, such as a gigabit Ethernet adapter. The NIC 912 is capable of connecting the computer 900 to other computing devices over the network 808. It should be appreciated that multiple NICs 912 can be present in the computer 900, connecting the computer to other types of networks and remote computer systems.

The computer 900 can include storage 914 (e.g., disk) that provides non-volatile storage for the computer. The storage 914 can consist of one or more physical storage units. The storage 914 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the storage 914 by detecting the physical states or characteristics of one or more particular locations within the physical storage units.

In addition to the storage 914 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900. In some examples, the operations performed by the computing-resource network 700, and or any components included therein, may be supported by one or more devices similar to computer 900. Stated otherwise, some or all of the operations performed by the computing-resource network 700, and or any components included therein, may be performed by one or more computer devices 900 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 914 can store an operating system utilized to control the operation of the computer 900. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 914 can store other system or application programs and data utilized by the computer 900.

In one embodiment, the storage 914, RAM 908, ROM 910, and/or other computer-readable storage media may be encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various techniques described above. The computer 900 can also include computer-readable storage media having instructions stored thereupon for performing any of the other computer-implemented operations described herein.

Generally, the computer 900 may be an example of a host device 102, such as a server (and other computing devices, network devices, etc.) described herein. The CPU(s) 904, RAM 908, ROM 910, storage 914, bandwidth of the NIC 912, and/or other resources of the computer 900 may be allocated to one or more different VM instances as described herein based on different VM instance types.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

In some examples, the computing-resource network 700 may be or comprise a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network can provide on-demand, scalable computing services to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or client.

The cloud provider network may implement various computing resources or services, which may include a virtual compute service, data processing service(s) (e.g., map reduce, data flow; and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computing device comprising:
one or more processors; and
physical memory comprising:
    shared memory configured to be shared among multiple processes; and
    private memory configured for use by individual processes to which it is allocated,
wherein the physical memory stores computer-executable instructions that, when executed by one or more processors, cause the one or more processors to perform operations comprising:
    allocating, to a first virtual machine (VM) running on the computing device, first virtual memory that corresponds to a first portion of the physical memory;

allocating, to a second VM running on the computing device, second virtual memory that corresponds to a second portion of the physical memory;
dividing a first virtual address space of the first virtual memory into first small pages and first large pages, wherein the first small pages map to the shared memory and the first large pages map to the private memory;
dividing a second virtual address space of the second virtual memory into second small pages and second large pages, wherein the second small pages map to the shared memory and the second large pages map to the private memory;
determining to load a first process into the first virtual memory on behalf of a first program running in the first VM, the first process being a private process;
based at least in part on the first process being the private process, loading the first process into a first large page of the first virtual address space;
determining to load a second process into virtual memory on behalf of a second program running in the first VM, the second process being a shared process;
based at least in part on the second process being the shared process, loading the second process into a first small page of the first virtual address space,
wherein a hardware address of the physical memory to which the first small page maps is shared with a second small page in the second virtual address space.

2. The computing device of claim 1, the operations further comprising:
specifying that a first access mode of the first large page is a read-write mode;
running the second process in the read-write mode in the second large page;
specifying that a second access mode of the first small page is a read-only mode; and
running the second process in the read-only mode in the first small page.

3. The computing device of claim 1, the operations further comprising:
determining to launch the first VM and the second VM on the computing device using a same VM image file;
identifying hardware addresses of the shared memory to which a first set of the first small pages and a second set of the second small pages are both mapped; and
loading the VM image file into the shared memory at the hardware addresses such that the VM image file is shared by the first set of the first small pages and the second set of the second small pages of the first VM and the second VM.

4. The computing device of claim 1, wherein:
the first small pages and second small pages have respective page sizes of approximately 4 kilobytes (KB); and
the first large pages and second large pages have respective page sizes within a range of approximately 16 KB to 1 gigabyte (GB).

5. A computer-implemented method comprising:
running a first virtual machine (VM) on a computing device, the first VM having first virtual memory that corresponds to a first portion of physical memory of the computing device;
running a second VM on the computing device, the second VM having second virtual memory that corresponds to a second portion of the physical memory;
determining to load a process into the first virtual memory on behalf of a first program running in the first VM;

determining whether the process is private to the first program or sharable with a second program running in the second VM;

in response to determining that the process is private, loading the process into a large page of a first virtual address space of the first virtual memory; and in response to determining that the process is sharable, loading the process into a small page of the first virtual address space, wherein a hardware address of the physical memory to which the first small page maps is shared with a second small page in a second virtual address space of the second virtual memory.

6. The computer-implemented method of claim 5, in response to determining that the process is sharable, further comprising:

specifying that an access mode of the first small page is a read-only mode; and running the process in the read-only mode in the first small page.

7. The computer-implemented method of claim 5, in response to determining that the process is private, further comprising:

specifying that an access mode of the large page is a read-write mode; and running the process in the read-write mode in the large page.

8. The computer-implemented method of claim 5, further comprising:

determining to launch the first VM and the second VM on the computing device using a same VM image file;

identifying hardware addresses of shared memory to which first small pages of the first virtual address space and second small pages of the second virtual address space are mapped; and loading the VM image file into the shared memory at the hardware addresses such that the VM image file is shared by the first small pages and the second small pages of the first VM and the second VM.

9. The computer-implemented method of claim 5, further comprising:

determining to launch the first VM and the second VM on the computing device using a same VM image file;

providing the first VM and second VM with first small pages of the first virtual address space and second small pages of the second virtual address space for the VM image file;

subsequent to launching the first and second VMs, providing programs running in the first and second VMs with first large pages of the first virtual address space and second first pages of the second virtual address space.

10. The computer-implemented method of claim 5, further comprising:

dividing the first virtual address space into first small pages and first large pages, wherein the first small pages map to shared memory and the first large pages map to private memory; and dividing the second virtual address space into second small pages and second large pages, wherein the second small pages map to the shared memory and the second large pages map to the private memory.

11. The computer-implemented method of claim 5, further comprising:

reserving the first portion of the physical memory for use by the first VM; and reserving the second portion of the physical memory for use by the second VM, wherein the first portion and the second portion at least partially overlap such that the physical memory is overcommitted.

12. The computer-implemented method of claim 5, wherein:

the first small pages and second small pages have respective page sizes of approximately 4 kilobytes (KB); and the first large pages and second large pages have respective page sizes within a range of approximately 16 KB to 1 gigabyte (GB).

13. A system comprising:

one or more processors; and physical memory comprising shared memory and private memory, wherein the physical memory stores computer-executable instructions that, when executed by one or more processors, cause the one or more processors to perform operations comprising:

causing a first guest operating system (OS) associated with a first virtual machine (VM) and a second guest operating system associated with a second VM to enter into a first mode in which the first guest OS and second guest OS load processes into small pages of virtual memories;

running the first VM, the first VM having first virtual memory that corresponds to a first portion the physical memory;

running a second VM, the second VM having second virtual memory that corresponds to a second portion of the physical memory;

determining to load a first process into a first virtual address space of the first virtual memory;

based at least in part on being in the first mode, loading the first process into a first small page of the first virtual address space, wherein a hardware address of the shared memory to which the first small page maps is shared with a second small page in a second virtual address space of the second virtual memory;

causing the first guest OS and second guest OS to enter into a second mode during which the first and second guest OSes load processes into large pages;

determining to load a second process into the first virtual address space; and based at least in part on being in the second mode, loading the second process into a large page of the first virtual address space, wherein the large page maps to the private memory.

14. The system of claim 13, the operations further comprising:

specifying that an access mode of the first small page is a read-only mode; and running the second process in the read-only mode in the shared memory.

15. The system of claim 13, the operations further comprising:

specifying that an access mode of the large page is a read-write mode; and running the first process in the read-write mode in a section of the private memory that maps to the large page.

16. The system of claim 13, the operations further comprising:

determining to launch the first VM and the second VM on the system using a same VM image file;

identifying hardware addresses of the shared memory to which first small pages of the first virtual address space and second small pages of the second virtual address space are mapped; and loading the VM image file into the shared memory at the hardware addresses such that the VM image file is shared by the first small pages and the second small pages of the first VM and the second VM.

17. The system of claim 13, the operations further comprising:

determining to launch the first VM and the second VM using a same VM image file;

providing the first VM and second VM with first small pages of the first virtual address space and second small pages of the second virtual address space for the VM image file;

subsequent to launching the first and second VMs, providing programs running in the first and second VMs with first large pages of the first virtual address space and second first pages of the second virtual address space.

18. The system of claim 13, the operations further comprising:

dividing the first virtual address space into first small pages and first large pages, wherein the first small pages map to shared memory and the first large pages map to private memory; and dividing the second virtual address space into second small pages and second large pages, wherein the second small pages map to the shared memory and the second large pages map to the private memory.

19. The system of claim 13, the operations further comprising:

reserving the first portion of the physical memory for use by the first VM; and reserving the second portion of the physical memory for use by the second VM, wherein the first portion and the second portion at least partially overlap such that the physical memory is overcommitted.

20. The system of claim 13, wherein:

the first small pages and second small pages have respective page sizes of approximately 4 kilobytes (KB); and the first large pages and second large pages have respective page sizes within a range of approximately 16 KB to 1 gigabyte (GB).

\* \* \* \* \*